United States Patent
Miyagawa et al.

(10) Patent No.: US 6,208,371 B1
(45) Date of Patent: Mar. 27, 2001

(54) LASER BEAM IMAGE RECORDING APPARATUS

(75) Inventors: Ichirou Miyagawa, Minamiashigara; Takeshi Kiso, Odawara; Takaaki Kosuge, Kanagawa-ken; Hiroshi Sunagawa, Odawara, all of (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/257,262

(22) Filed: Feb. 25, 1999

(30) Foreign Application Priority Data

Mar. 11, 1998 (JP) .................................................. 10-060196

(51) Int. Cl.⁷ ................................ B41J 27/00; B41J 2/45; B41J 15/14
(52) U.S. Cl. ............................ 347/261; 347/238; 347/241
(58) Field of Search .................................. 347/241, 244, 347/246, 256, 253, 261

(56) References Cited

U.S. PATENT DOCUMENTS

| | | | |
|---|---|---|---|
| 4,270,149 | * 5/1981 | Ohta et al. | 358/293 |
| 4,272,651 | * 6/1981 | Yoshida et al. | 369/112 |
| 4,679,057 | * 7/1987 | Hamada | 346/76 L |
| 4,822,151 | * 4/1989 | Tatsuno et al. | 350/401 |
| 4,963,003 | * 10/1990 | Hiiro | 350/403 |
| 4,971,412 | 11/1990 | Hiiro | 359/206 |
| 5,253,265 | 10/1993 | Seko et al. | 372/46 |
| 5,567,066 | * 10/1996 | Paranjpe | 400/249 |
| 5,657,071 | 8/1997 | Shinohara | 347/252 |
| 5,717,511 | * 2/1998 | Suzuki | 347/243 |
| 5,844,591 | * 12/1998 | Takamatsu et al. | 347/235 |
| 6,009,112 | * 12/1999 | Uchida | 372/46 |

FOREIGN PATENT DOCUMENTS

| | | |
|---|---|---|
| 0 269 122 A2 | 6/1988 | (EP) . |
| 8-20621 | 3/1996 | (JP) ................................ G02B/27/09 |
| 92/09976 | 6/1992 | (WO) ................................ G06K/15/12 |
| WO 92/09910 | 6/1992 | (WO) . |

* cited by examiner

Primary Examiner—Thinh Nguyen
(74) Attorney, Agent, or Firm—Sughrue, Mion, Zinn, Macpeak & Seas, PLLC

(57) ABSTRACT

A laser beam emitted by a semiconductor laser is applied through a beam shaper optical system to a recording film to produce the image of a near field pattern of the laser beam which is of a narrow width in a main scanning direction of the recording film and which has a wide, substantially rectangular intensity distribution in an auxiliary scanning direction. The image recorded on the recording film is free of image density irregularities in the auxiliary scanning direction.

11 Claims, 13 Drawing Sheets

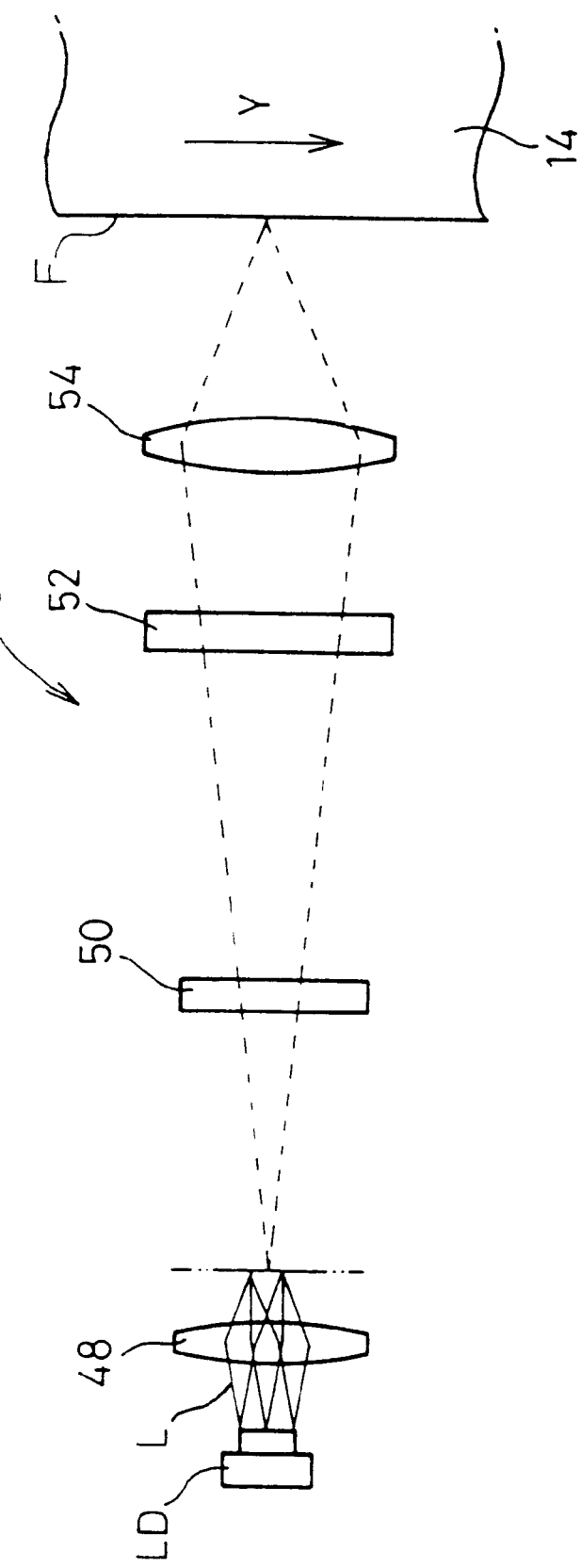

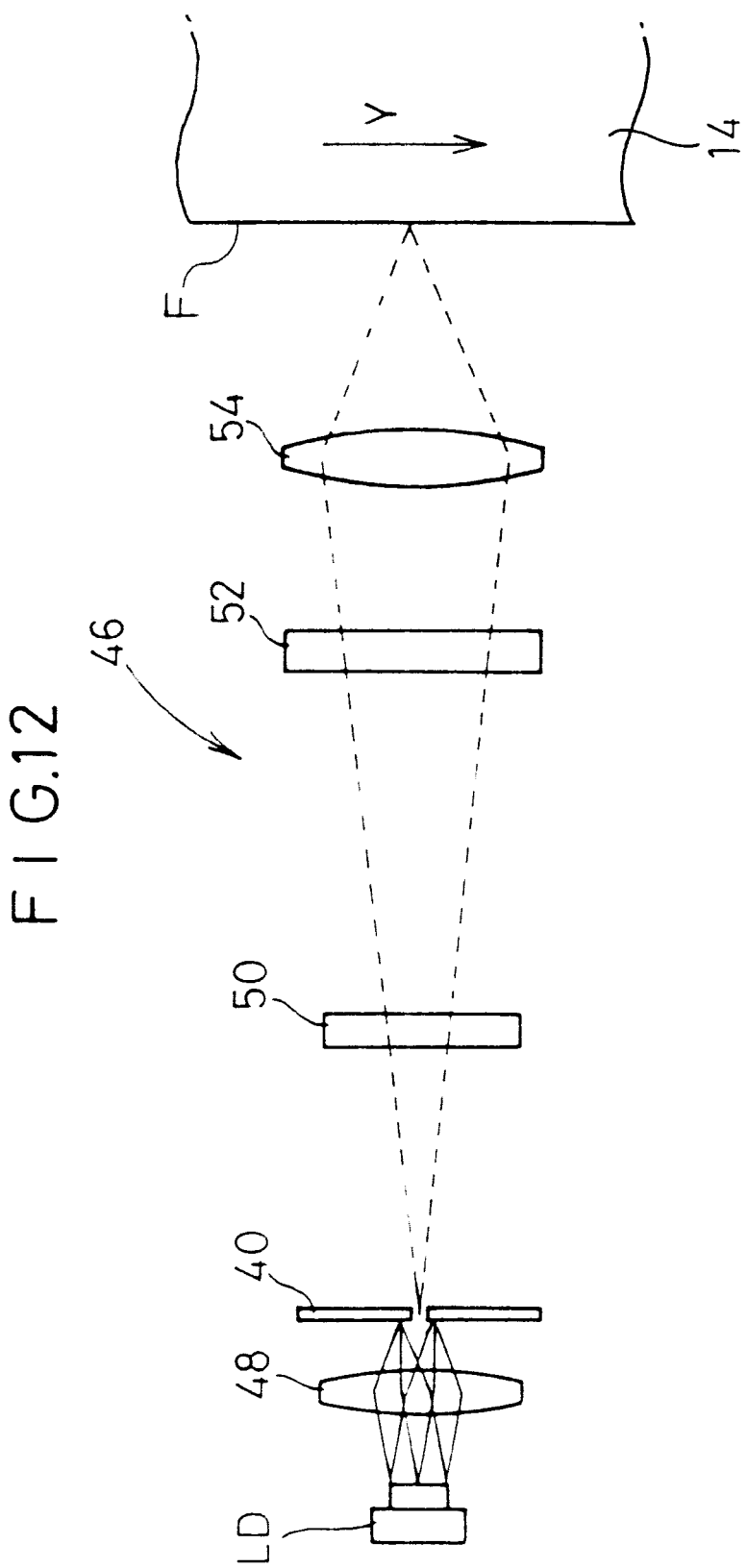

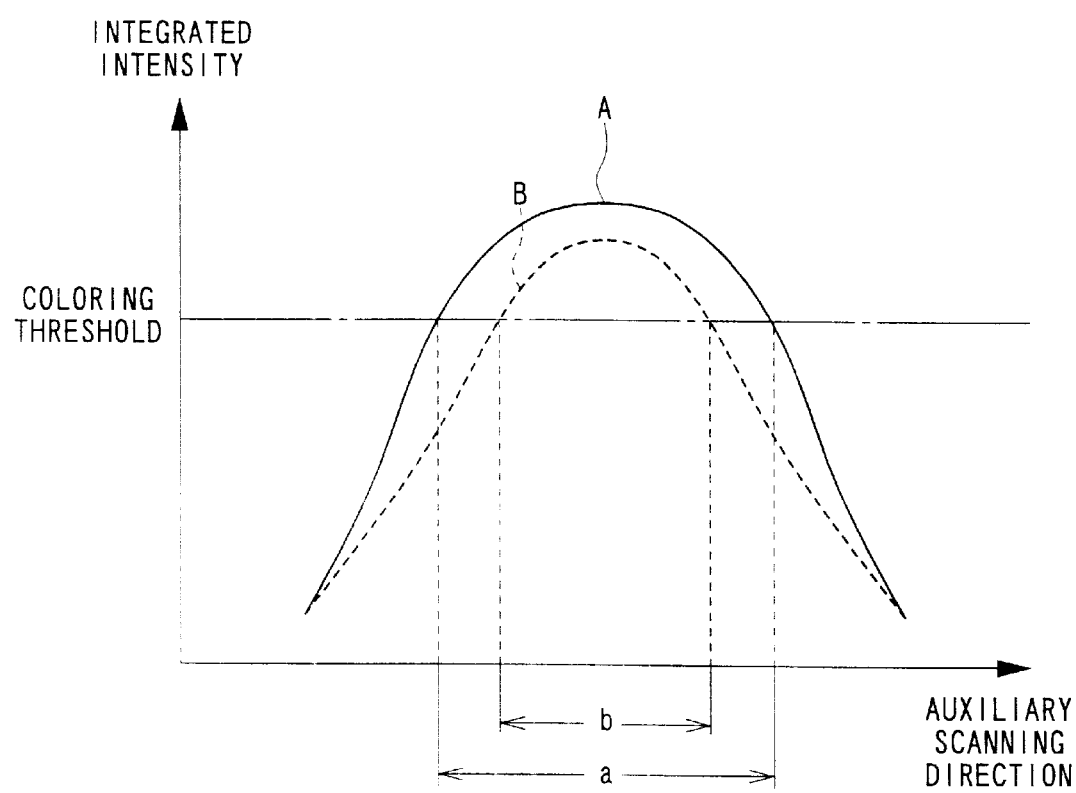

LASER BEAM IMAGE RECORDING APPARATUS

BACKGROUND OF THE INVENTION

1. Field of the Invention

The present invention relates to a laser beam image recording apparatus for recording an area-modulated image on a recording medium with a semiconductor laser beam.

2. Description of the Related Art

In the art of image recording, there has been employed a laser beam image recording apparatus for driving a laser beam optical system with a processed digital image signal to record an area-modulated image on a recording medium. The recording medium with the image recorded thereon is supplied to an image developing machine, which develops the recorded image from a latent image representation into a visible image representation.

The laser beam optical system has a laser beam source which may be a coherent laser beam source such as a single transverse mode semiconductor laser, an optical fiber laser, etc., or an incoherent laser beam source such as an optical fiber coupled laser, a semiconductor laser array, etc. capable of producing a high laser beam output power. More attention has been drawn to semiconductor lasers than gas lasers because the semiconductor lasers offer many advantages as they are small in size, light in weight, high in efficiency, and long in service life. Laser beam image recording apparatus incorporating semiconductor lasers have been developed in the art.

When a laser beam emitted by a coherent laser beam source is focused on a recording medium, the focused spot of the laser beam has a Gaussian intensity distribution.

When a laser beam is emitted by an optical fiber coupled laser, since the laser beam is guided by an optical fiber to a position near a recording medium, the focused spot of the laser beam on the recording medium is a circular spot with a substantially uniform intensity distribution.

Laser beam image recording apparatus usually generate a two-dimensional image on a recording medium by scanning the recording medium in a main scanning direction with a laser beam while the recording medium is being fed in an auxiliary scanning direction normal to the main scanning direction. Because the optical energy of the laser beam applied as a circular spot to the recording medium is integrated in the main scanning direction, the laser beam spot on the recording medium has an intensity distribution that is close to a Gaussian intensity distribution in the auxiliary scanning direction.

A laser beam emitted by a semiconductor laser array is focused on a recording medium with a noded linear intensity configuration along the array of semiconductor lasers.

If the integrated intensity of a laser beam on a recording medium has a Gaussian distribution along the auxiliary scanning direction as shown in FIG. 13 of the accompanying drawings, then when the laser beam varies in intensity or the focused laser beam spot positionally deviates from the recording medium, the integrated intensity varies as indicated by a characteristic curve A or B, so that the coloring range determined by the coloring threshold of the recording medium changes to a coloring range "a" or "b". The change in the coloring range results in an irregularity of the image density. If an image having a straight edge in the main scanning direction is recorded by the laser beam, then the image density irregularity makes the edge of the image staggered in the auxiliary scanning direction. Furthermore, if a recording medium has sensitivity irregularities or an image developing machine has image developing ability irregularities, then since these irregularities tend to change the coloring threshold of the recording medium, an image on the recording medium suffers image density irregularities. If the focused spot of a laser beam on a recording medium has a noded linear intensity configuration, then an image recorded on the recording medium also suffers image density irregularities due to the noded linear intensity configuration.

According to a radiation source for a printer disclosed in Japanese patent publication No. 8-20621, a telecentric optical system is disposed between a laser diode array and a recording medium for focusing a near field pattern of a laser beam emitted from the laser diode array on the recording medium thereby to keep the minimum level of a noded linear intensity distribution higher than the coloring threshold of the recording medium. With the disclosed radiation source, however, the output power level of the laser diode array has to be higher than the coloring threshold, resulting in a very poor laser beam utilization efficiency. Because the laser diode array is required to produce a high output power level, the laser diode array suffers a relatively short service life, and needs to be replaced frequently.

SUMMARY OF THE INVENTION

It is a general object of the present invention to provide a laser beam image recording apparatus which is of a relatively simple structure and is capable of recording area-modulated images free of image density irregularities in an auxiliary scanning direction on a recording medium.

A major object of the present invention is to provide a laser beam image recording apparatus which can produce images free of image density irregularities without use of a high output power semiconductor laser.

Another object of the present invention is to provide a laser beam image recording apparatus which has an increased allowable range of positional deviation between a focused laser beam spot and a recording medium.

Still another object of the present invention is to provide a laser beam image recording apparatus which can minimize image density irregularities on a recording medium due to sensitivity irregularities of the recording medium.

Yet still another object of the present invention is to provide a laser beam image recording apparatus which is capable of recording images by effectively utilizing the energy of a laser beam.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a schematic plan view of a laser beam image recording apparatus which employs a far field pattern according to another embodiment of the present invention;

FIG. 12 is a schematic plan view of a modification of the laser beam image recording apparatus shown in FIG. 10, the modification incorporating an aperture member; and FIG. 13 is a diagram illustrative of how image density irregularities are generated using a laser beam source which emits a laser beam whose intensity has a Gaussian distribution on a recording medium.

DETAILED DESCRIPTION OF THE PREFERRED EMBODIMENTS

Figure 1:
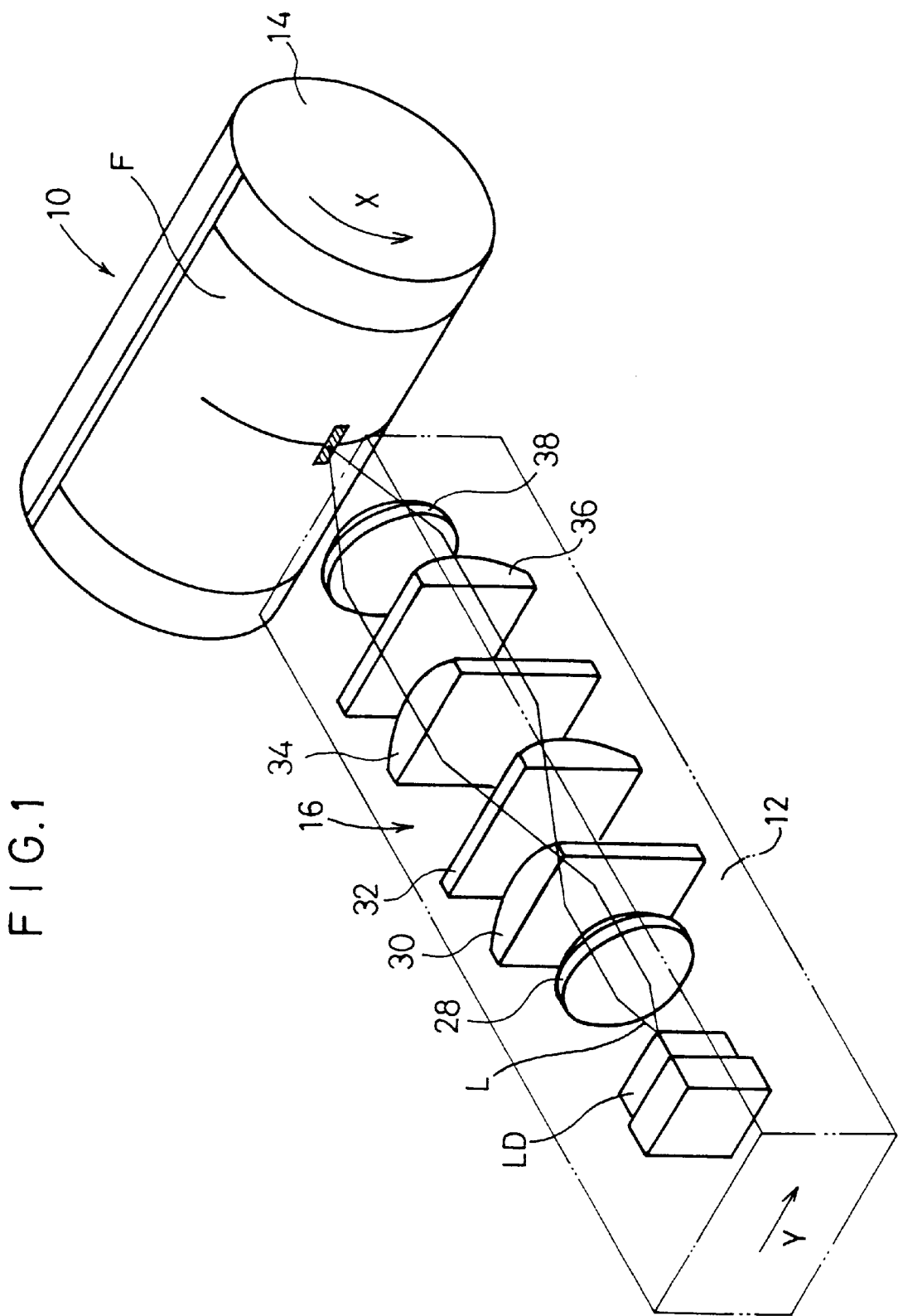
FIG. 1 is a schematic perspective view of a laser beam image recording apparatus which employs a near field pattern according to an embodiment of the present invention.
Figure 2:
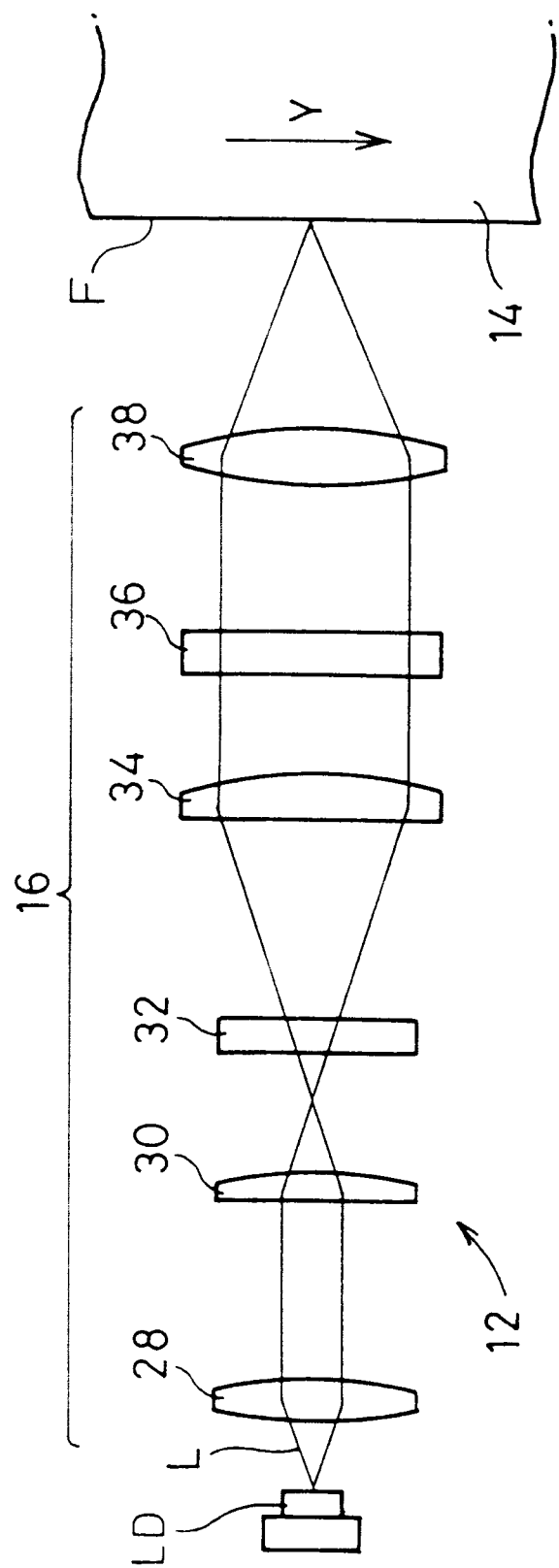
FIG. 2 is a schematic plan view of the laser beam image recording apparatus shown in FIG. 1.

FIGS. 1 and 2 show a laser beam image recording apparatus 10 which employs a near field pattern according to an embodiment of the present invention. As shown in FIGS. 1 and 2, the laser beam image recording apparatus 10 records an area-modulated image on a recording film (recording medium) F on a drum 14 by applying a laser beam L emitted from an exposure head 12 to the recording film F. The area-modulated image is recorded two-dimensionally on the recording film F when the drum 14 rotates about its own axis in the direction (main scanning direction) indicated by the arrow X while the exposure head 12 is moving in the direction (auxiliary scanning direction) indicated by the arrow Y along the axis of the drum 14. The area-modulated image is an image having a desired gradation that is achieved by the area taken up by a plurality of pixels which are formed on the recording film F by turning on and off the laser beam L.

The exposure head 12 comprises a semiconductor laser LD for generating the laser beam L and a beam shaper optical system 16 for forming the image of a near field pattern of the laser beam L on the recording film F.

Figure 3:
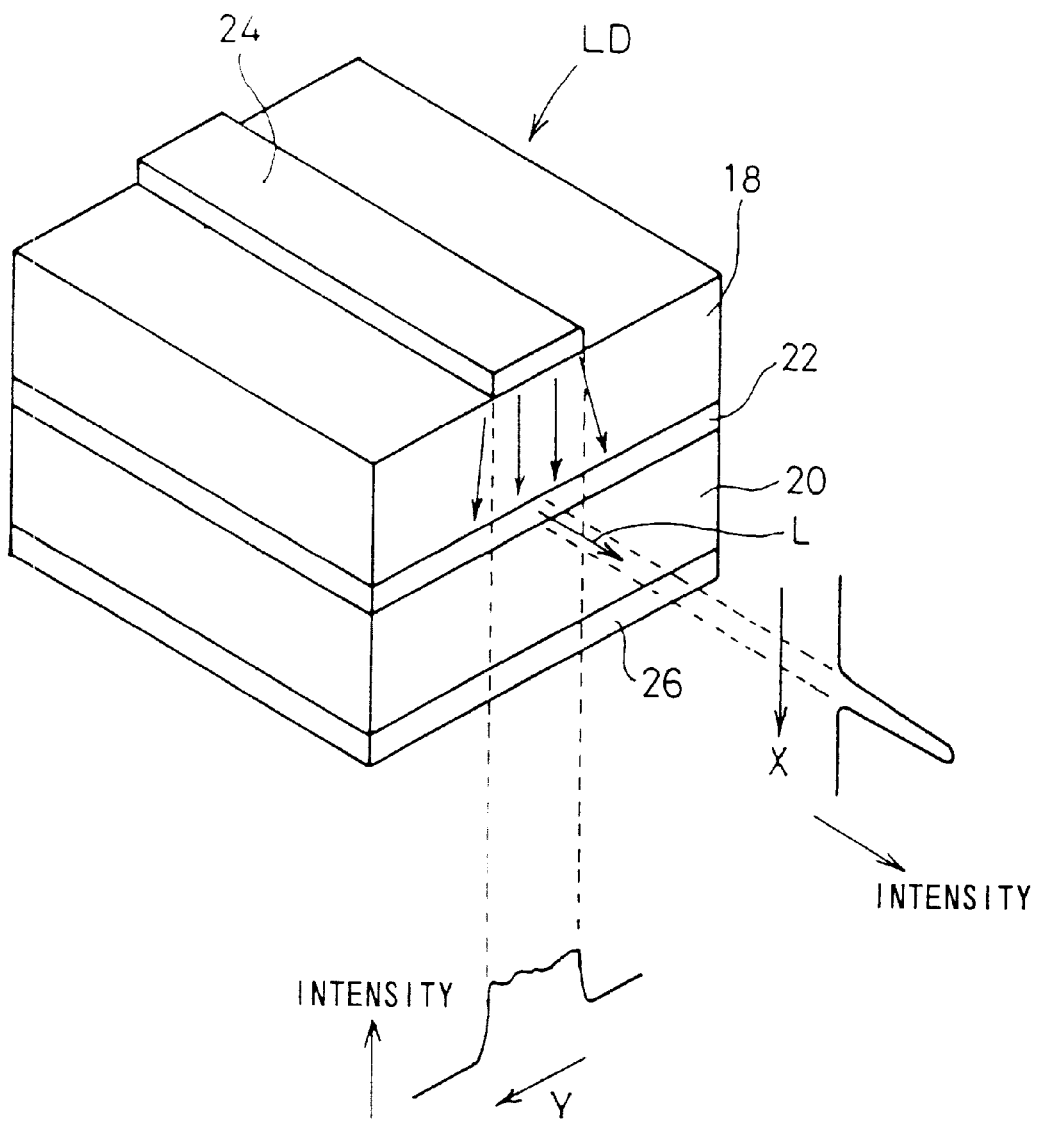
FIG. 3 is an enlarged perspective view of a semiconductor laser of the laser beam image recording apparatus shown in FIG. 1, the view also showing a configuration of a laser beam emitted by the semiconductor laser.

The semiconductor laser LD comprises an index waveguide semiconductor laser. Basically, as shown in FIG. 3, the semiconductor laser LD has a p-type semiconductor substrate 18, an n-type semiconductor substrate 20, and an active layer 22 interposed between the semiconductor substrates 18, 20. The semiconductor laser LD also includes electrodes 24, 26 mounted on respective surfaces of the semiconductor substrates 18, 20 remotely from the active layer 22. When a predetermined voltage is applied between the electrodes 24, 26, the active layer 22 emits the laser beam L. The electrode 24 on the semiconductor substrate 18 has a limited width much smaller than the semiconductor substrate 18. The active layer 22 has its refractive index controlled in its region corresponding to the width of the electrode 24 along the plane of the active layer 22. As shown in FIG. 3, the laser beam L emitted from the semiconductor laser LD has an emission pattern which is wide and substantially rectangular in shape along a joined surface of the active layer 22 that lies parallel to the auxiliary scanning direction Y and corresponds to the width of the electrode 24 and which is of a narrow width corresponding to the thickness of the active layer 22 in the direction across the thickness of the active layer 22.

The beam shaper optical system 16 serves to shape and apply the image of the near field pattern of the laser beam L emitted from the semiconductor laser LD to the recording film F. The beam shaper optical system 16 comprises a condenser lens 28, a plurality of cylindrical lenses 30, 32, 34, 36, and a condenser lens 38 which are successively arranged in the order named from the semiconductor laser LD. The cylindrical lenses 30, 34 serve to converge the laser beam L only in the auxiliary scanning direction indicated by the arrow Y, and the cylindrical lenses 32, 36 serve to converge the laser beam L only in the main scanning direction indicated by the arrow X.

The laser beam image recording apparatus 10 is basically constructed as described above. Operation and advantages of the laser beam image recording apparatus 10 will be described below.

The laser beam L modulated by image information and emitted from the active layer 22 of the semiconductor laser LD has its near field pattern converged into a parallel ray beam by the condenser lens 28. Thereafter, the laser beam L is shaped only in the auxiliary scanning direction indicated by the arrow Y by the cylindrical lenses 30, 34, and also shaped only in the main scanning direction indicated by the arrow X by the cylindrical lenses 32, 36. The image of the near field pattern of the laser beam L is then formed on the recording film F on the drum 14 by the condenser lens 38.

Figure 4:
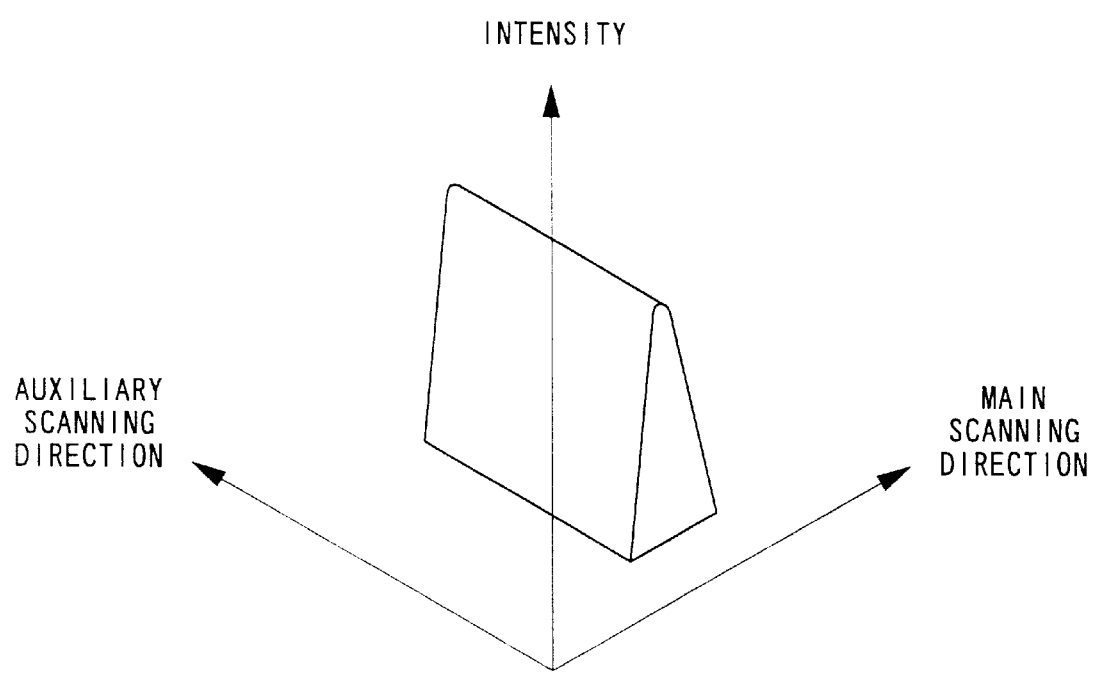
FIG. 4 is a diagram showing an intensity distribution of the laser beam on a recording medium in the laser beam image recording apparatus shown in FIG. 1.
Figure 5:
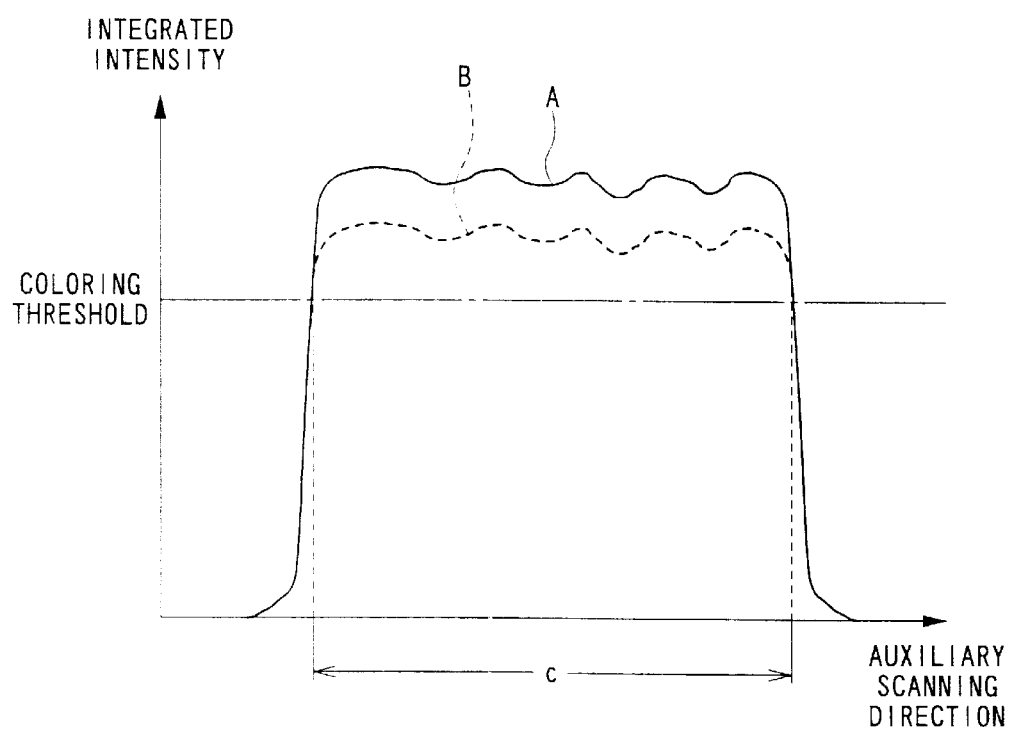
FIG. 5 is a diagram showing an integrated intensity in an auxiliary scanning direction of the laser beam on a recording medium in the laser beam image recording apparatus shown in FIG. 1.

The near field pattern has an intensity distribution configuration as shown in FIG. 3. On the recording film F, as shown in FIGS. 4 and 5, even though the optical energy of the laser beam L is integrated in the main scanning direction, the integrated intensity of the laser beam L in the auxiliary scanning direction does not have a Gaussian distribution configuration. As a result, even when the laser beam L varies in intensity or the focused spot of the laser beam L positionally deviates from the recording medium F, resulting in a change in the integrated intensity as indicated by a characteristic curve A or B in FIG. 5, a coloring range "c" determined by the coloring threshold of the recording film F remains unchanged, so that substantially no image density irregularities are produced in the auxiliary scanning direction. Furthermore, the semiconductor laser LD may comprise a transverse multimode semiconductor laser for emitting a laser beam which is wide in the auxiliary scanning direction, so that the intensity of the laser beam L on the recording medium F does not have a Gaussian distribution configuration in the auxiliary scanning direction.

Figure 6:
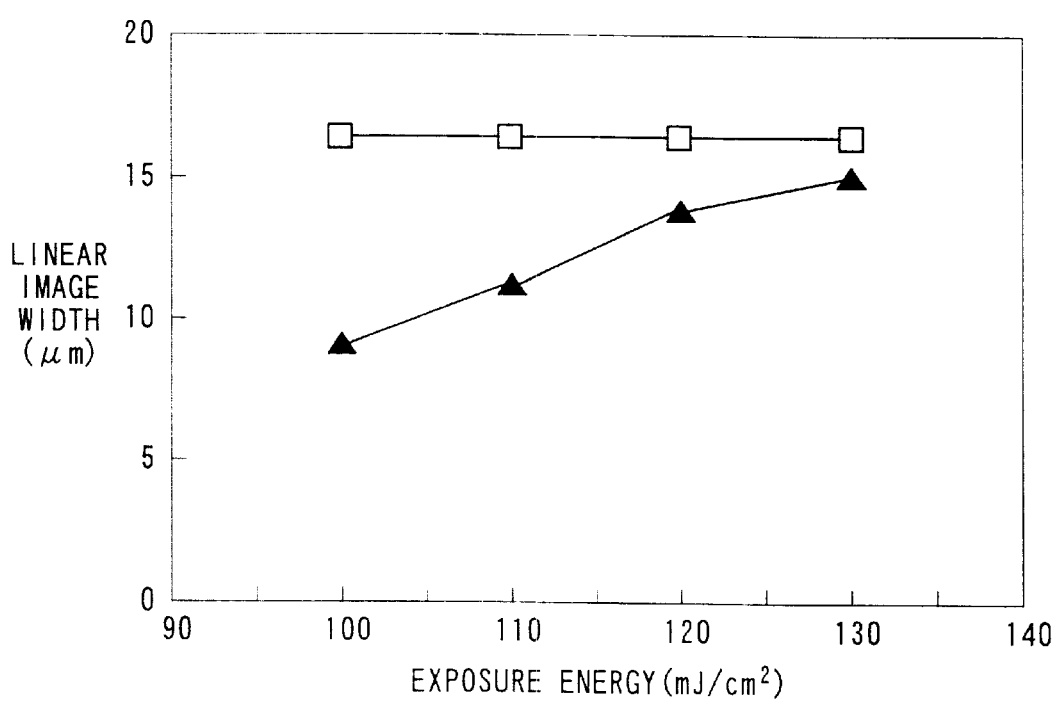
FIG. 6 is a diagram showing the relationship between the exposure energy on a recording medium and the width of a linear image in the laser beam image recording apparatus shown in FIG. 1 and a conventional laser beam image recording apparatus.

FIG. 6 shows for comparison the widths in the auxiliary scanning direction of linear images produced on a thermal-type recording film F when the recording film F was exposed linearly in the main scanning direction to the laser beam L, whose intensity has a rectangular distribution, emitted by the semiconductor laser LD shown in FIG. 3 (experimental results are represented by □) and when the recording film F was exposed linearly in the main scanning direction to a light beam, whose intensity has a nearly Gaussian distribution, emitted by a conventional light source (experimental results are represented by ▲). A review of FIG. 6 indicates that the width of the linear image produced on the recording film F by exposure to the light beam whose intensity has a nearly Gaussian distribution increases as the exposure energy, i.e., the optical energy of the light beam to which the recording film F is exposed, increases, whereas the width of the linear image produced on the recording film F by exposure to the laser beam whose intensity has a rectangular distribution is constant regardless of the exposure energy.

If the thermal-type recording film is made of a photosensitive material with a low-intensity reciprocity law failure, then when the intensity distribution of the laser beam L on the recording film F is narrow in the main scanning direction, the thermal-type recording film has an increased recording sensitivity. Therefore, the thermal-type recording film is capable of recording images free of image density irregularities at high speed.

Figure 7:
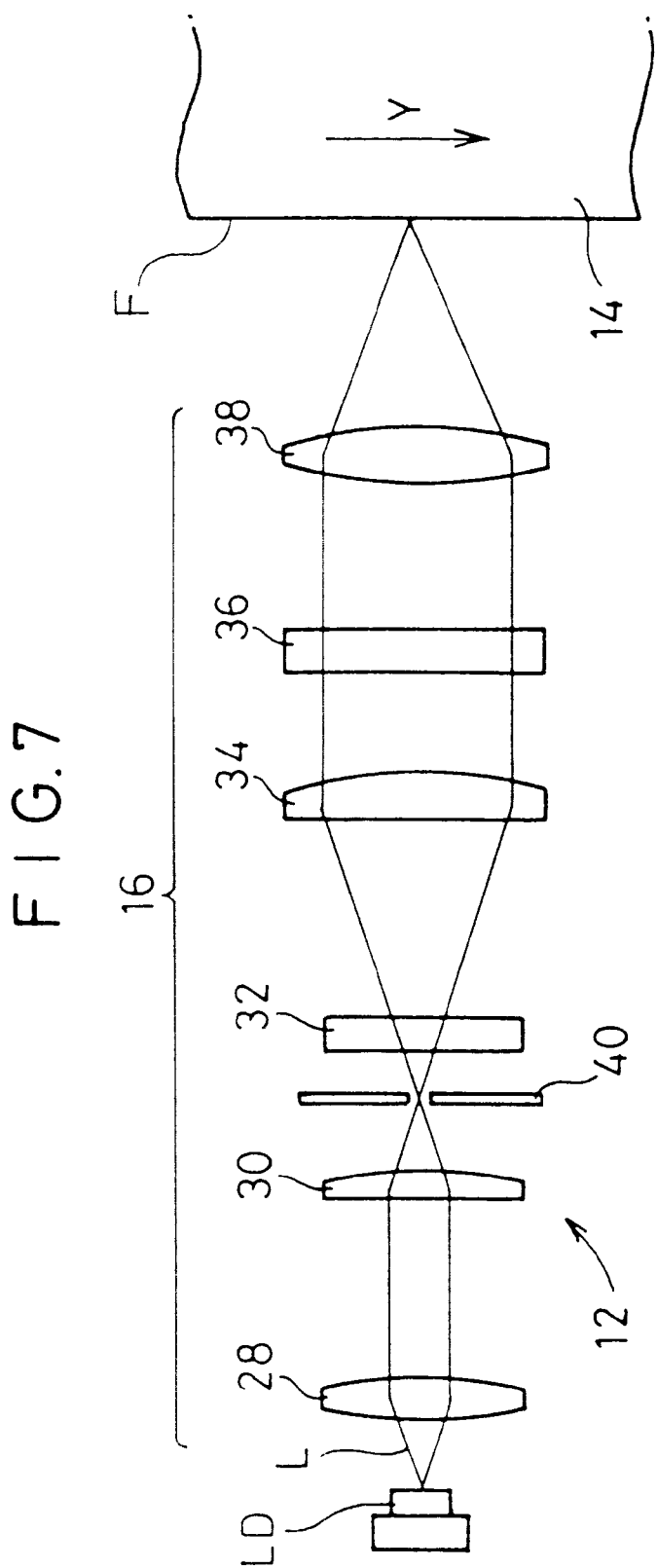
FIG. 7 is a schematic plan view of a modification of the laser beam image recording apparatus shown in FIG. 2, the modification incorporating an aperture member.
Figure 8:
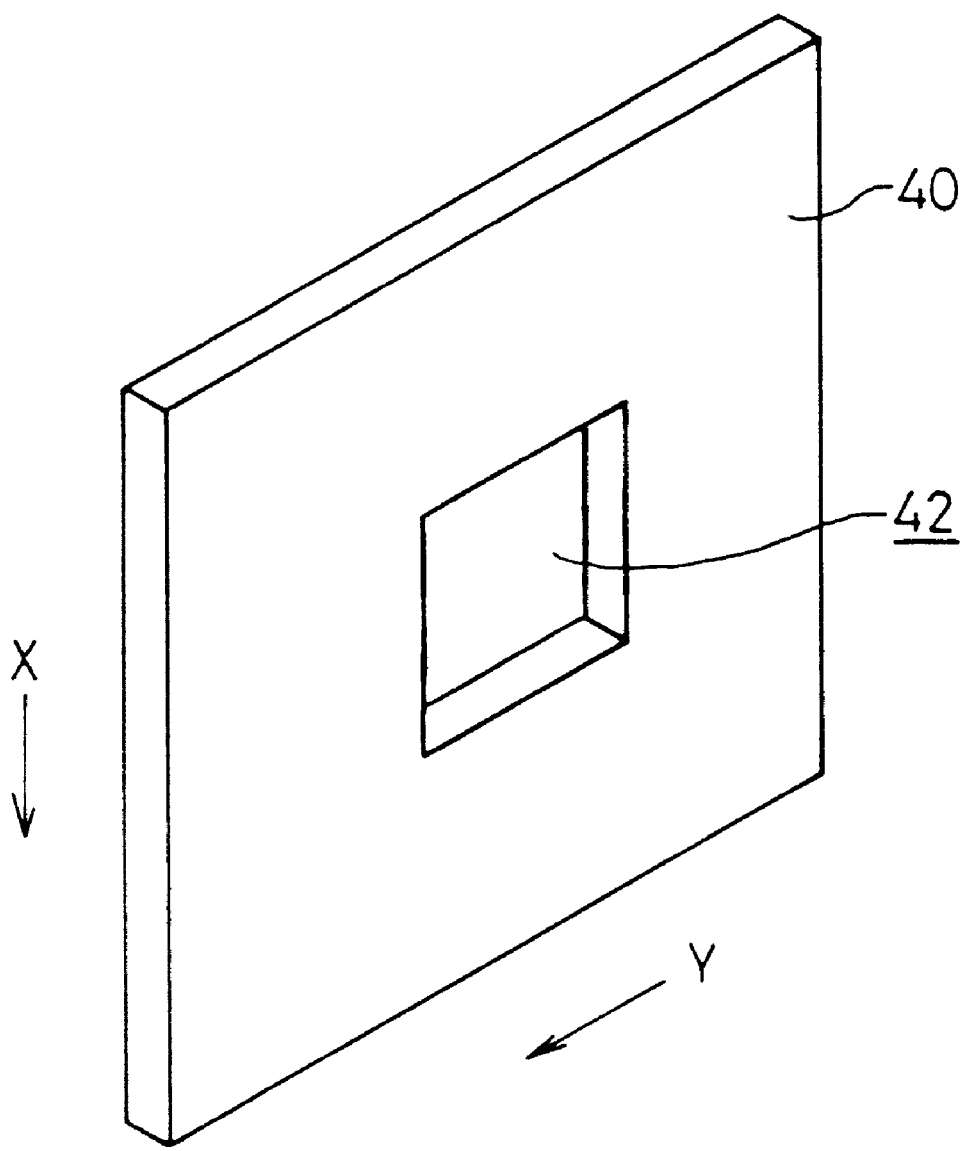
FIG. 8 is a perspective view of the aperture member shown in FIG. 7.

FIG. 7 shows a modification of the laser beam image recording apparatus 10 shown in FIGS. 1 and 2, which additionally includes an aperture member 40 positioned at a focal point between the cylindrical lenses 30, 32. As shown in FIG. 8, the aperture member 40 has a rectangular opening 42 defined therein. The rectangular opening 42 is positioned so as to vignette opposite end portions in at least the auxiliary scanning direction of the near field pattern of the laser beam L.

Figure 9A:
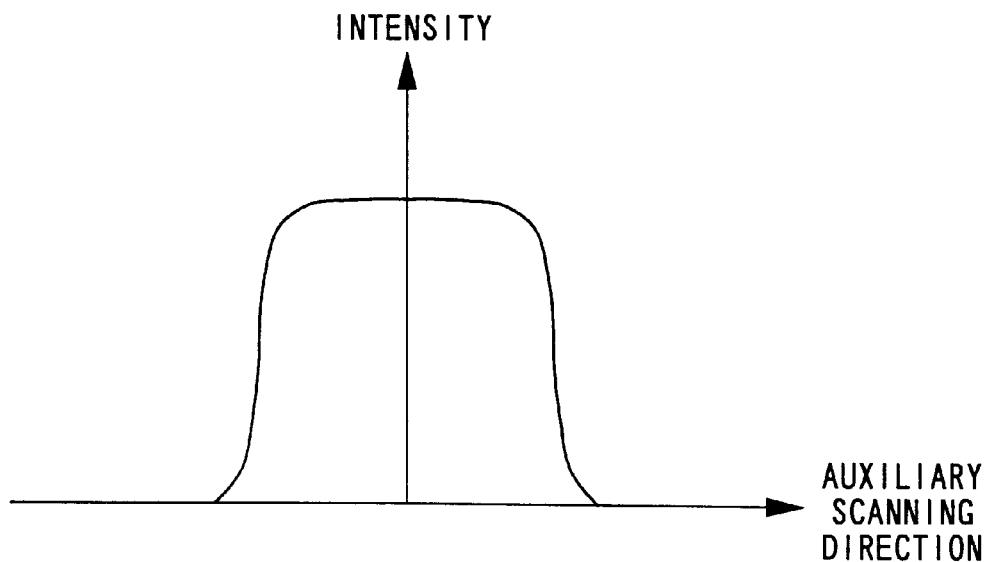
FIG. 9A is a diagram showing the intensity distribution in an auxiliary scanning direction of a laser beam before the laser beam passes through the aperture member shown in FIG. 8.
Figure 9B:
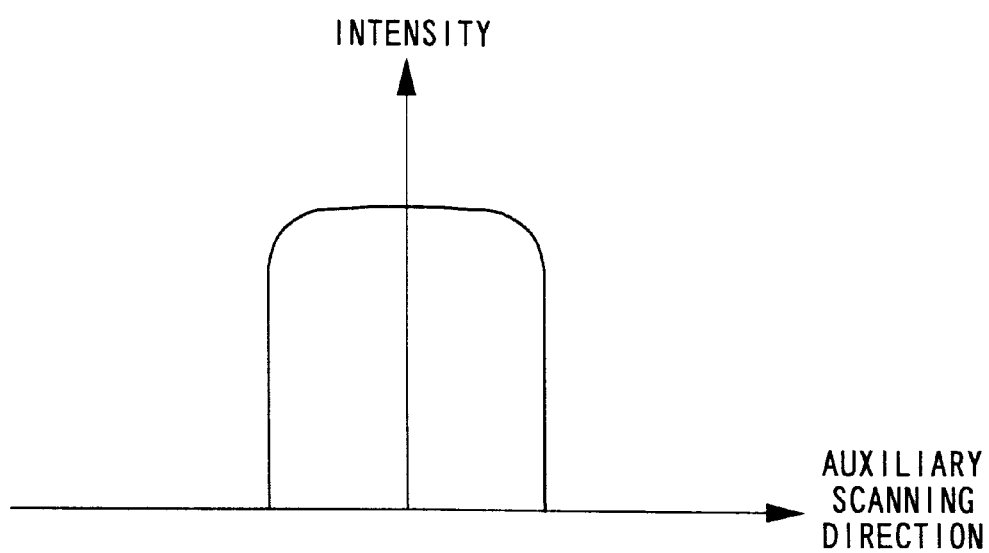
FIG. 9B is a diagram showing the intensity distribution in an auxiliary scanning direction of a laser beam after the laser beam passes through the aperture member shown in FIG. 8.

The laser beam L which passes through the cylindrical lens 30 toward the aperture member 40 has an intensity distribution as shown in FIG. 9A immediately before the laser beam L passes through the opening 42, but has an intensity distribution as shown in FIG. 9B after the laser beam L passes through the opening 42. As shown in FIG. 9B, the intensity distribution of the laser beam L has its opposite edges cut off in the auxiliary scanning direction because the intensity distribution is shaped by the opening 42. As a consequence, the intensity distribution of the laser beam L is of a nearly rectangular shape. When an image is recorded on the recording film F by the laser beam L thus shaped, the recorded image is more effectively free of image density irregularities in the auxiliary scanning direction.

FIG. 10 shows a laser beam image recording apparatus which employs a far field pattern according to another embodiment of the present invention. As shown in FIG. 10, the laser beam image recording apparatus has a beam shaper optical system 46 for forming the image of a far field pattern of a laser beam L emitted from a semiconductor laser LD on a recording film F. The beam shaper optical system 46 comprises a condenser lens 48, a plurality of cylindrical lenses 50, 52, and a condenser lens 54 which are successively arranged in the order named from the semiconductor laser LD.

Figure 11A:
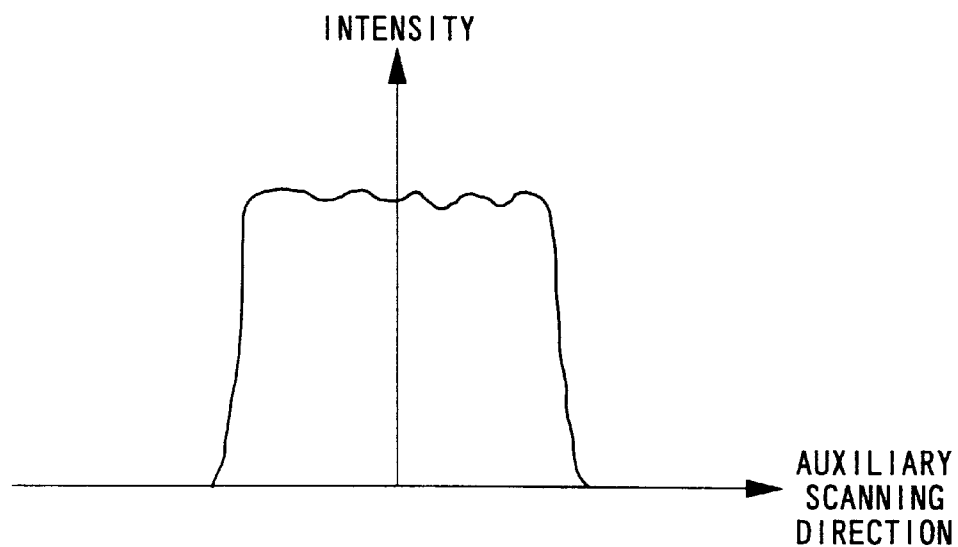
FIG. 11A is a diagram showing the intensity distribution in an auxiliary scanning direction of a far field pattern of a laser beam emitted by a semiconductor laser of the laser beam image recording apparatus shown in FIG. 10.
Figure 11B:
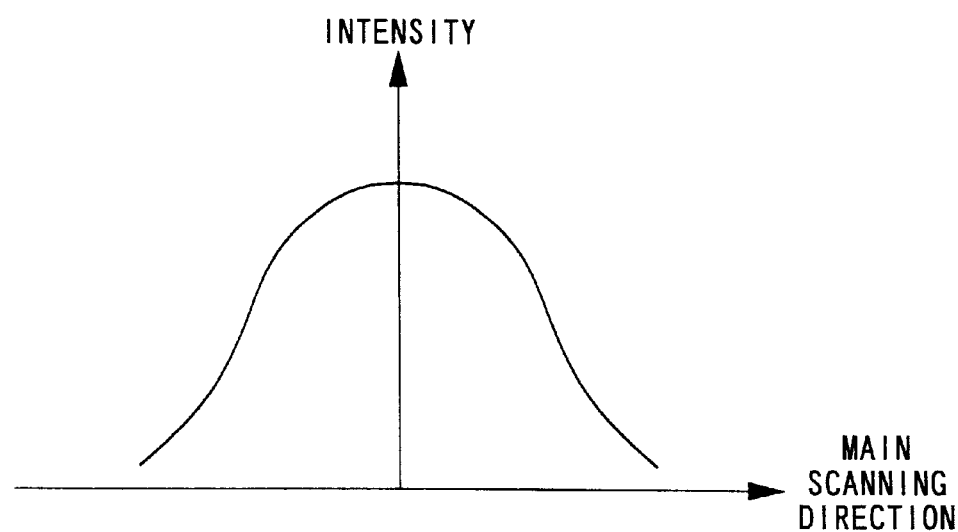
FIG. 11B is a diagram showing the intensity distribution in a main scanning direction of the far field pattern of the laser beam emitted by the semiconductor laser the laser beam image recording apparatus shown in FIG. 10.

The condenser lens 48, which has a focal length f, converges the laser beam L emitted from the semiconductor laser LD to form a far field pattern of the laser beam L at a position (indicated by the two-dot-and-dash lines in FIG. 10) spaced the focal length f from a rear principal point of the condenser lens 48. The far field pattern of the laser beam L has intensity distributions in auxiliary and main scanning directions, respectively, as shown in FIGS. 11A and 11B. Since the laser beam L which has thus formed the far field pattern has a Gaussian intensity distribution in the main scanning direction, the laser beam L is shaped only in the main scanning direction by the cylindrical lenses 50, 52. The laser beam L is then converged onto the recording film F by the condenser lens 54. In this manner, the laser beam Lmage recording apparatus shown in FIG. 10 can record images free of image density irregularities on the recording film F.

FIG. 12 shows a modification of the laser beam image recording apparatus shown in FIG. 10, which additionally includes an aperture member 40 disposed at the position where the far field pattern of the laser beam L is formed between the condenser lens 48 and the cylindrical lens 50 of the beam shaper optical system 46. The aperture member 40 shown in FIG. 12 is identical to the aperture member 40 shown in FIGS. 7 and 8. The modified laser beam image recording apparatus is capable of producing a nearly rectangular laser beam intensity distribution on the recording film F to record images which are more effectively free of image density irregularities.

In each the above embodiments, the semiconductor laser LD comprises an index waveguide semiconductor laser. However, the laser beam image recording apparatus may employ a semiconductor laser of any of other structures insofar as it is capable of emitting a laser beam whose intensity distribution has sharp edges in the auxiliary scanning direction of the recording film F and is narrow in the main scanning direction thereof.

Since image density irregularities are minimized by the laser beam image recording apparatus, images which are formed by the laser beam image recording apparatus with the laser beam L emitted from the semiconductor laser LD may preferably be area-modulated images, particularly halftone-dot images produced by modulating the spatial frequency depending on the image density, i.e., so-called FM (frequency-modulated) images.

Although certain preferred embodiments of the present invention have been shown and described in detail, it should be understood that various changes and modifications may be made therein without departing from the scope of the appended claims.

What is claimed is:
1. A laser beam image recording apparatus comprising:
   a transverse multimode semiconductor laser which emits a laser beam; and
   a beam shaper optical system which shapes the laser beam emitted by said transverse multimode semiconductor laser and applies the shaped laser beam to a recording medium;
   said transverse multimode semiconductor laser and said beam shaper optical system being arranged such that the recording medium is scanned in a main scanning direction by said laser beam which has a substantially rectangular intensity distribution in an auxiliary scanning direction transverse to said main scanning direction, to thereby record an area-modulated image on said recording medium.
2. A laser beam image recording apparatus according to claim 1, wherein said semiconductor laser has an active layer including a joined surface, said auxiliary scanning direction being parallel to said joined surface.

3. A laser beam image recording apparatus according to claim 1, wherein said laser beam emitted by said semiconductor laser is modulated in spatial frequency to record a halftone-dot image on said recording medium.

4. A laser beam image recording apparatus according to claim 1, wherein said beam shaper optical system produces the image of a near field pattern of the laser beam emitted by said semiconductor laser on said recording medium.

5. A laser beam image recording apparatus according to claim 4, wherein said beam shaper optical system has a condenser lens for converting the laser beam emitted by said semiconductor laser into a parallel ray beam and converging said parallel ray beam to produce the image of the near field pattern of the laser beam on said recording medium.

6. A laser beam image recording apparatus according to claim 4, wherein said beam shaper optical system includes an aperture member for removing opposite end portions in at least the auxiliary scanning direction of the near field pattern of the laser beam.

7. A laser beam image recording apparatus according to claim 1, wherein said beam shaper optical system produces the image of a far field pattern of the laser beam emitted by said semiconductor laser on said recording medium.

8. A laser beam image recording apparatus according to claim 7, wherein said beam shaper optical system has a condenser lens for converging the laser beam emitted by said semiconductor laser to produce the image of the far field pattern of the laser beam on said recording medium.

9. A laser beam image recording apparatus according to claim 7, wherein said beam shaper optical system includes an aperture member for removing opposite end portions in at least the auxiliary scanning direction of the far field pattern of the laser beam.

10. A laser beam image recording apparatus according to claim 1, wherein said recording medium comprises a thermal-type recording medium.

11. A laser beam image recording apparatus according to claim 10, wherein said thermal-type recording medium is made of a photosensitive material with a low-intensity reciprocity law failure.

* * * * *